Aug. 28, 1928.
C. RIEBE
1,682,146
DEVICE FOR PRODUCING CONFECTIONERY CONTAINING AN AROMATIC LIQUID
Filed Oct. 4, 1926
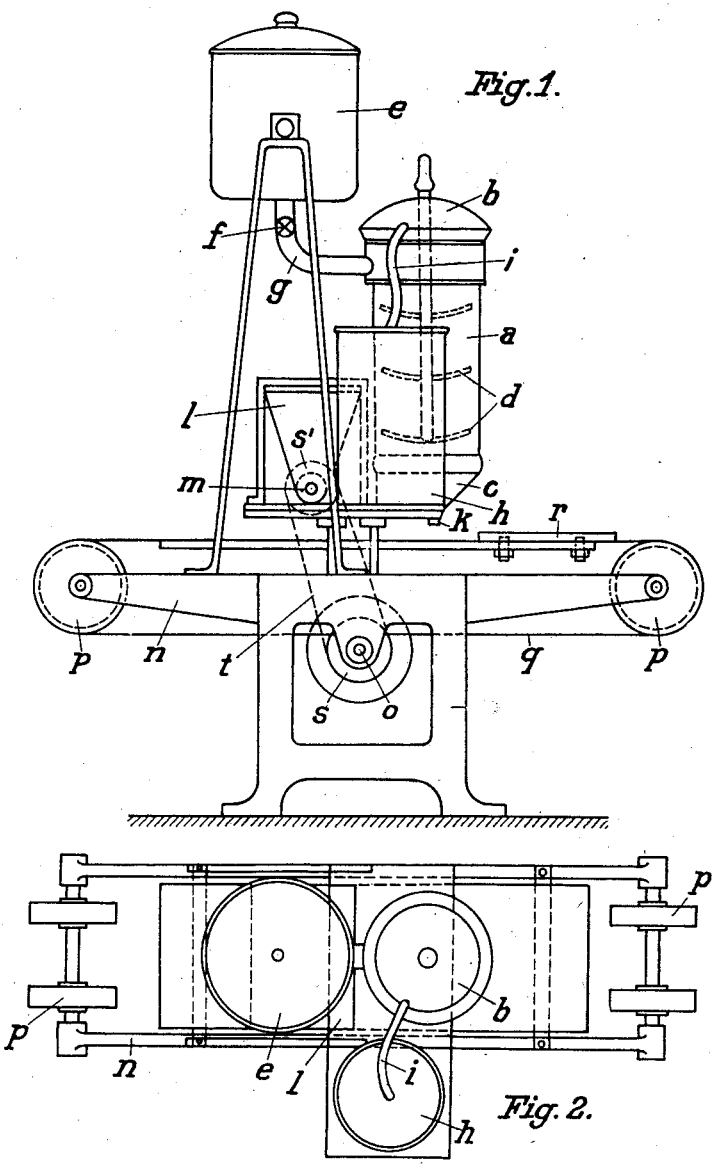
Inventor:
Carl Riebe
by Carl Fr. Reichelt
Attorney Patented Aug. 28, 1928.

1,682,146

UNITED STATES PATENT OFFICE.

CARL RIEBE, OF DRESDEN-NEUSTADT, GERMANY.

DEVICE FOR PRODUCING CONFECTIONERY CONTAINING AN AROMATIC LIQUID.

Application filed October 4, 1926, Serial No. 139 514, and in Germany December 15, 1924.

This invention relates to the process of producing confectionery containing an aromatic liquid and particularly to the fillings of confection of the bean type and the like.

Under the processes hitherto applied to the manufacture of confectionery of this class the sugar is first prepared and boiled at a certain temperature and preferably in an open vessel. The boiled sugar is then transferred to a closed mixing vessel either by pouring or scooping and the desired flavor such as peppermint, fruit juice, etc., added whereupon the sugar and its admixtures are thoroughly intermixed by stirring. The mixture is then either scooped out or poured into the casting ladle and poured into the molds by hand. A final step consists in powdering the filled molds in the known manner for the purpose of stimulating the formation of crystals on the surface of the composition, too.

The known processes suffer from serious drawbacks which, aside from the cumbersome use of a number of separate vessels and the loss of time resulting therefrom, chiefly consist in a considerable evaporation of the aromatic admixtures during the constant transfers, cooling of the mixture and a loss of sugar crystals, as the composition grows cold during transfers and deposits prematurely sugar crystals in the vessels to such an extent that the sugar contents required for the crystallization of the composition in the molds are missing. Experience shows that up to 50% of the aromatic additions vaporize under the known processes while my invention eliminates these drawbacks.

The main feature of the invention is that the mixing and casting of the sugar composition and the simultaneous powdering of the finished articles is effected in one continuous step. The preparatory step of boiling the sugar may also be connected with the process if desired.

To illustrate the new process a device by means of which the process is applied is described below.

In the accompanying drawing Fig. 1 is a front view and Fig. 2 a top view of the device. $a$ is a mixing vessel closed by a lid $b$ and having a funnel-shaped outlet $c$ at the bottom. Within the vessel $a$ a mixing device $d$ capable of being caused to rotate or move up and down is arranged. $e$ is a boiler for the sugar composition and can be heated in any known manner, by a steam coil for instance, which is not shown. From the boiler $e$ a piping $g$ provided with a closing member $f$ leads to the mixing vessel $a$ which, by means of the pipe $i$, is connected with the condenser $h$. The aromatic admixtures are put in the vessel $a$ and precipitated and recovered in the condenser $h$ if they evaporate. At the end of the funnel-shaped outlet $c$ is the discharge orifice $k$. $l$ is a powder box whose lower opening is provided with a brush. All parts mentioned are arranged on the common work table $n$, whose underframe $n'$ carries the main shaft $o$. At both ends of the table are arranged the rolls $p$ over which the conveyor belt $q$ runs which serves for moving the mold box $r$. From the main shaft $o$ a belt $t$ runs over the pulleys $s$, $s'$ to drive the brush $m$.

The device functions as follows:

The sugar is boiled in the vessel $e$ and the boiled mass directly transferred through the pipe $g$ to the mixing vessel $a$ where the admixtures are added and the mixing process takes place. The mixture then reaches the funnel-shaped outlet $c$ and passes through the discharge orifice $k$ into the molds. The conveyor belt $q$ then places the molds under the powdering device for powdering, and the entire process is thus carried out in one continuous step and with the greatest possible cleanliness.

I claim:—

A device for producing confectionery containing aromatic liquids comprising, in combination, a mixing vessel with superimposed boiler, a condenser arranged near the said mixing vessel and being connected with same, the said mixing vessel being provided at its lower end with a discharge orifice for the mixture, a powder container arranged near the mixing vessel, and a conveyor travelling below the mixing vessel and the powder container for receiving the molds.

In testimony whereof I affix my signature.

CARL RIEBE.